United States Patent
Simon et al.

(10) Patent No.: US 8,013,706 B2
(45) Date of Patent: Sep. 6, 2011

(54) SYSTEM FOR CONTACTLESS ENERGY TRANSMISSION

(75) Inventors: Olaf Simon, Bruchsal (DE); Jochen Mahlein, Karlsruhe (DE); Klaus Schwesinger, Bruchsal (DE); Leobald Podbielski, Karlsruhe (DE); Jochen Weber, Plankstadt (DE); Bernhard Schneider, Oberhausen-Rheinhausen (DE)

(73) Assignee: Sew—Eurodrive GmbH & Co. KG, Bruchsal (DE)

( * ) Notice: Subject to any disclaimer, the term of this patent is extended or adjusted under 35 U.S.C. 154(b) by 305 days.

(21) Appl. No.: 11/993,905

(22) PCT Filed: May 30, 2006

(86) PCT No.: PCT/EP2006/005124
§ 371 (c)(1),
(2), (4) Date: Dec. 26, 2007

(87) PCT Pub. No.: WO2006/136267
PCT Pub. Date: Dec. 28, 2006

(65) Prior Publication Data
US 2008/0204182 A1    Aug. 28, 2008

(30) Foreign Application Priority Data
Jun. 23, 2005   (DE) .......................... 10 2005 029 599

(51) Int. Cl.
*H01F 21/06* (2006.01)

(52) U.S. Cl. ......... 336/120; 336/119; 336/122; 336/123

(58) Field of Classification Search .................. 336/120, 336/119, 122, 123
See application file for complete search history.

(56) References Cited

U.S. PATENT DOCUMENTS

| | | | | |
|---|---|---|---|---|
| 2,138,837 | A * | 12/1938 | Cadman | 188/138 |
| 3,098,990 | A * | 7/1963 | Farrand et al. | 336/172 |
| 4,138,783 | A * | 2/1979 | Portier | 29/606 |
| 4,404,559 | A * | 9/1983 | Renner | 340/870.28 |
| 4,446,461 | A * | 5/1984 | Selleck | 340/870.32 |
| 5,994,788 | A * | 11/1999 | Dobler et al. | 307/10.1 |
| 6,218,924 | B1 * | 4/2001 | Zabler et al. | 336/120 |
| 6,268,673 | B1 * | 7/2001 | Shah et al. | 310/90.5 |
| 6,512,437 | B2 * | 1/2003 | Jin et al. | 336/178 |

(Continued)

FOREIGN PATENT DOCUMENTS

DE    1516571    11/1966

(Continued)

OTHER PUBLICATIONS

Translation of International Preliminary Report on Patentability, PCT International Patent Application No. PCT/EP2006/005124, dated Jan. 24, 2008.

(Continued)

*Primary Examiner* — Anh T. Mai
*Assistant Examiner* — Joselito Baisa
(74) *Attorney, Agent, or Firm* — Kenyon & Kenyon LLP

(57) ABSTRACT

System for contactless energy transmission includes a primary side winding and a secondary side winding that is rotatable relative to the primary side winding, a coil core being provided on the primary side winding, whose sectional view in at least one sectional plane containing the axis of rotation is formed as a U shape or C shape around the winding region of the primary side winding.

19 Claims, 4 Drawing Sheets

U.S. PATENT DOCUMENTS

Figure 1D:
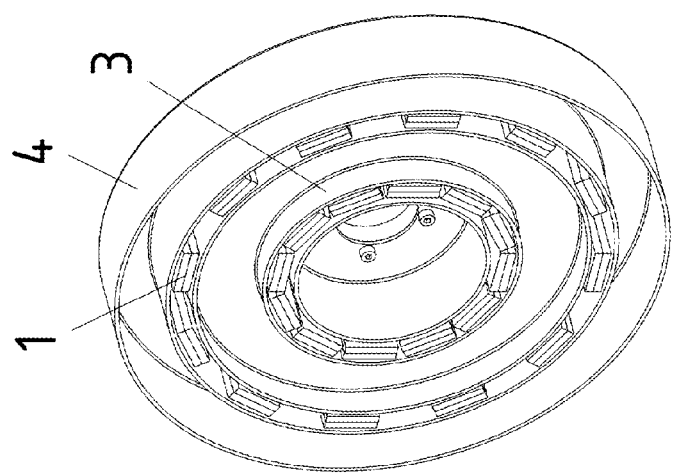

| | | | |
|---|---|---|---|
| 6,559,560 B1 | 5/2003 | Jin et al. | |
| 7,218,196 B2 * | 5/2007 | Nakao et al. | 336/83 |
| 7,605,681 B2 * | 10/2009 | Wobben | 336/130 |
| 2002/0033748 A1 * | 3/2002 | Bolotinsky et al. | 336/182 |
| 2005/0140483 A1 | 6/2005 | Wobben | |
| 2006/0022785 A1 * | 2/2006 | Dobbs | 336/120 |

FOREIGN PATENT DOCUMENTS

| | | |
|---|---|---|
| DE | 34 02 351 | 7/1985 |
| DE | 41 25 143 | 2/1993 |
| DE | 196 01 511 | 8/1997 |
| DE | 102 03 651 | 8/2003 |
| DE | 10 2005 029 599 | 12/2006 |
| DE | 10 2005 063 345 | 4/2007 |
| FR | 2775383 | 8/1999 |
| GB | 2183102 | 5/1987 |
| WO | 03/065389 | 8/2003 |

OTHER PUBLICATIONS

International Search Report, PCT International Patent Application No. PCT/EP2006/005124, dated Sep. 15, 2006.

Written Opinion of the International Searching Authority, PCT International Patent Application No. PCT/EP2006/005124, dated Sep. 15, 2006 (English-language translation provided).

* cited by examiner

SYSTEM FOR CONTACTLESS ENERGY TRANSMISSION

FIELD OF THE INVENTION

The present invention relates to a system for contactless energy transmission.

BACKGROUND INFORMATION

German Published Patent Application No. 34 02 351 describes two inductively coupled windings, which are situated rotatably with respect to each other in the same axial region and have different radii. The first surrounds the second. The construction is very complex however.

German Published Patent Application No. 41 25 143 describes a complex and costly approach having two windings.

SUMMARY

Example embodiments of the present invention provide a system for contactless energy transmission, which transmission is to be as simple and inexpensive and at the same time as effective as possible.

According to example embodiments of the present invention, a system is provided for contactless energy transmission, including a primary side winding and a secondary side winding that is rotatable relative to the primary side winding, a coil core being provided on the primary side winding and being formed such that its sectional view in at least one sectional plane containing the axis of rotation is formed as a U shape or C shape around the winding region of the primary side winding.

It is possible to conduct the magnetic lines of force through the core and thus provide a strong inductive coupling between the windings. Thus a resonant consumer is dispensable. A normal transformational transmission is sufficient. In addition, it is possible to use coil core components of such a kind that a cohesive inner coil core surface may be produced on the inner side of the coil core. Thus the entire flow from inside may be conducted on the outside around the winding through the C or U. When using a C or U, whose shanks and additional part always have the same cross-sectional area, even a substantially constant magnetic flux density may be generated and thus an optimum material utilization achieved.

Several such sectional planes may exist, which are situated with respect to each other such that they are rotated about the axis of rotation by a magnitude of an angle of rotation, in particular by a magnitude that is respectively equal to the closest adjacent sectional plane. A certain number of U or C may be situated on the circumference of the winding and thus the same components may always be used. Thus it is possible to produce particularly cost-effective coil cores. That is to say, no cut-open torus or cup needs to be produced.

A coil core may be provided on the primary side winding, whose sectional view in each sectional plane containing the axis of rotation is formed as a U shape or C shape around the winding region of the primary side winding. A specially formed rotation-shaped cup, that is, a rotation body may be used. To be sure, the material is not quite optimally utilized, since more material is provided on the outer circumference than on the inner circumference. It may be provided, however, that the manufacture may be performed more quickly and more simply in a specially produced form.

The coil core may include several U-shaped or C-shaped parts, which are situated on the circumference of the winding and whose shanks are oriented in a direction that is oriented parallel to the axis of rotation. In this instance it may be provided that the coil core is able to be produced in a simple and cost-effective manner.

The coil core may be provided on the primary side winding as substantially cup-shaped, the opening of the cup being provided toward the secondary side winding. As much magnetic flux as possible may be screened.

The coil core may be provided on the primary side winding as substantially cup-shaped, the opening of the cup being provided toward the secondary side winding. On the secondary side a simple plate may suffice as a lid.

The coil core may include on the secondary side and/or on the primary side winding homogeneous formed parts, e.g., a multitude of such parts. It is possible always to use homogeneous parts and thus the quantities are high and the costs per part are low.

A coil core may be provided on the secondary side winding, which is designed to be flat. The coil core may be manufactured in a simple and cost-effective manner. In addition, it uniformly captures the magnetic lines of force, which escape from the primary side coil core, independently of the rotational position or rotational speed.

A coil core may be provided on the secondary side winding, which is composed of parallelepiped blocks that are situated in a plane whose direction of surface normal extends parallel to the direction of the axis of rotation. A simple plate may suffice to fasten the parallelepiped blocks.

Features in the system are also that a primary side winding and a secondary side winding, which is rotatable relative to the primary side winding, are provided, the primary side winding being supplied with a voltage of medium frequency, a parallel-resonant circuit being provided whose resonant frequency is adjusted to the medium frequency. It may be provided that a rectifier is connected downstream from the parallel-resonant circuit, in particular for generating intermediate circuit voltage for a frequency converter. The consumer may be supplied with a constant voltage that is largely independent of the power withdrawn.

The medium frequency voltage supplying the primary side winding may take a square-wave course, that is, it may be a medium frequency square-wave voltage. The voltage may be produced in a simple and cost-effective manner, e.g., by using or retrofitting conventional supply devices.

Higher frequency signals may be modulated for data transmission between the primary and the secondary part. No additional lines may need to be laid, but rather the existing lines may be used in the transmission.

A leaky waveguide such as a slit coaxial cable, etc., may be provided for data transmission between the primary and the secondary part. A transmission free of interference may be feasible, that is, that a favorable signal-to-noise ratio may exist.

LIST OF REFERENCE CHARACTERS

| | |
|---|---|
| 1 | U-shaped core |
| 2 | winding |
| 3 | cover |
| 4 | housing part |
| 20 | ferrite plate |
| 21 | housing part |
| 22 | winding |
| 23 | cover |
| 40 | rectifier |

-continued

| 41 | power supply |
| --- | --- |
| T | rotary transformer |
| L | inductor |
| C | capacitor |

DETAILED DESCRIPTION

Figure 1C:
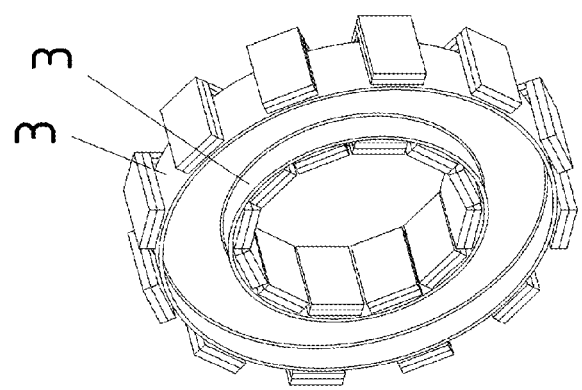
Figure 1B:
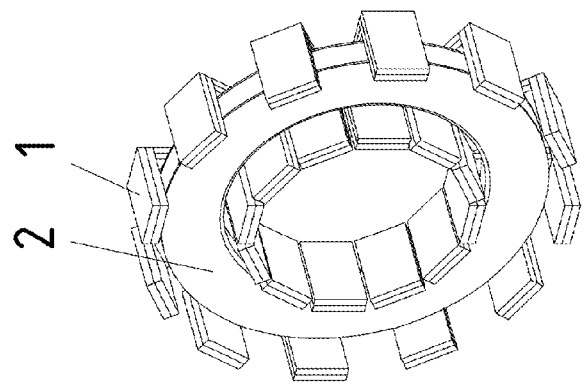
Figure 1A:
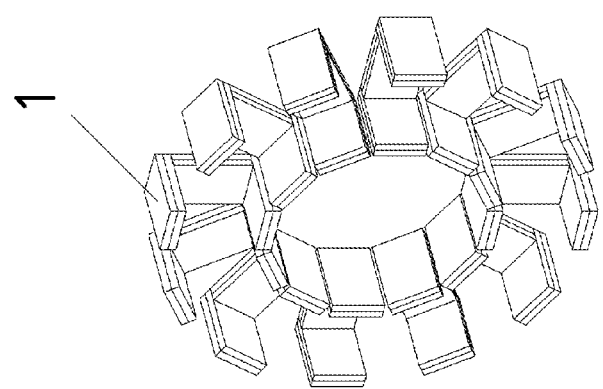

Example embodiments of the present invention are described in greater detail below with reference to the appended figures:

FIGS. 1a through 1d show the stator of a device according to an example embodiment of the present invention, FIG. 1a showing only the U-shaped cores situated on the circumference, FIG. 1b additionally showing the inserted winding 2, FIG. 1c additionally showing cover 3 for winding 2 and FIG. 1d showing housing part 4 of the stator.

Figure 2D:
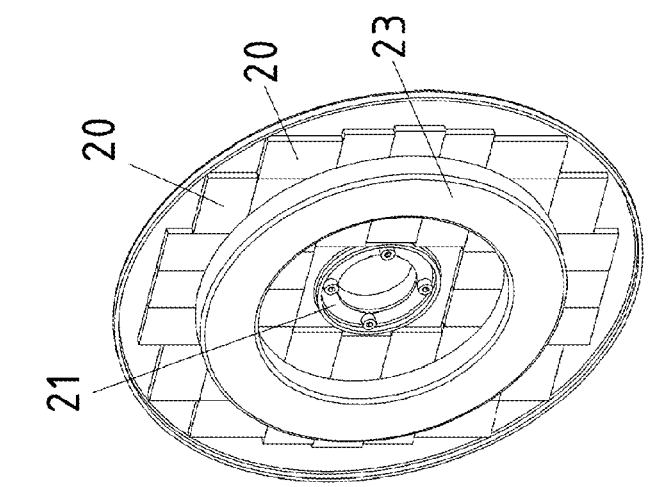
Figure 2C:
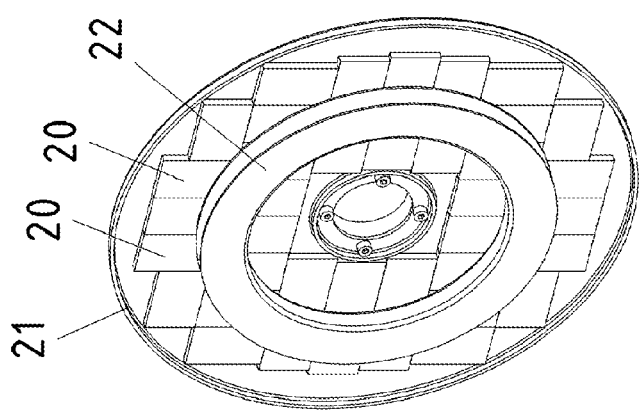
Figure 2B:
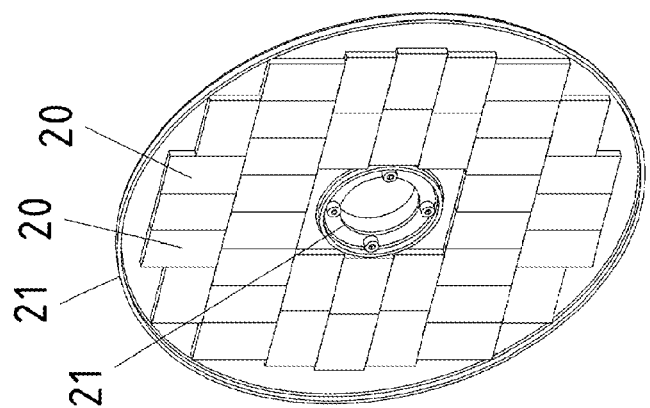
Figure 2A:
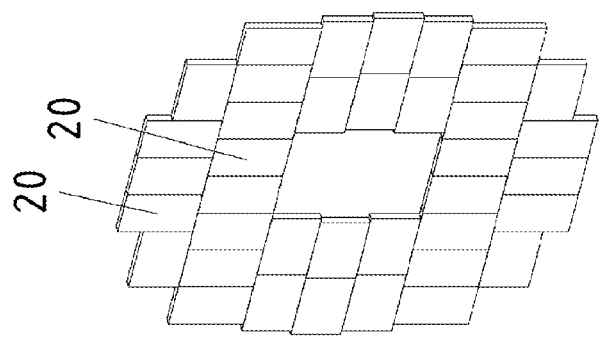

FIGS. 2a through 2d show the rotor of a device according to an example embodiment of the present invention, FIG. 2a showing only ferrite plates 20, FIG. 2b additionally showing housing part 21 having a round opening around the axis, FIG. 2c additionally showing winding 22 provided on the ferrite plates and FIG. 2d additionally showing cover 23 of the winding.

Figure 3:
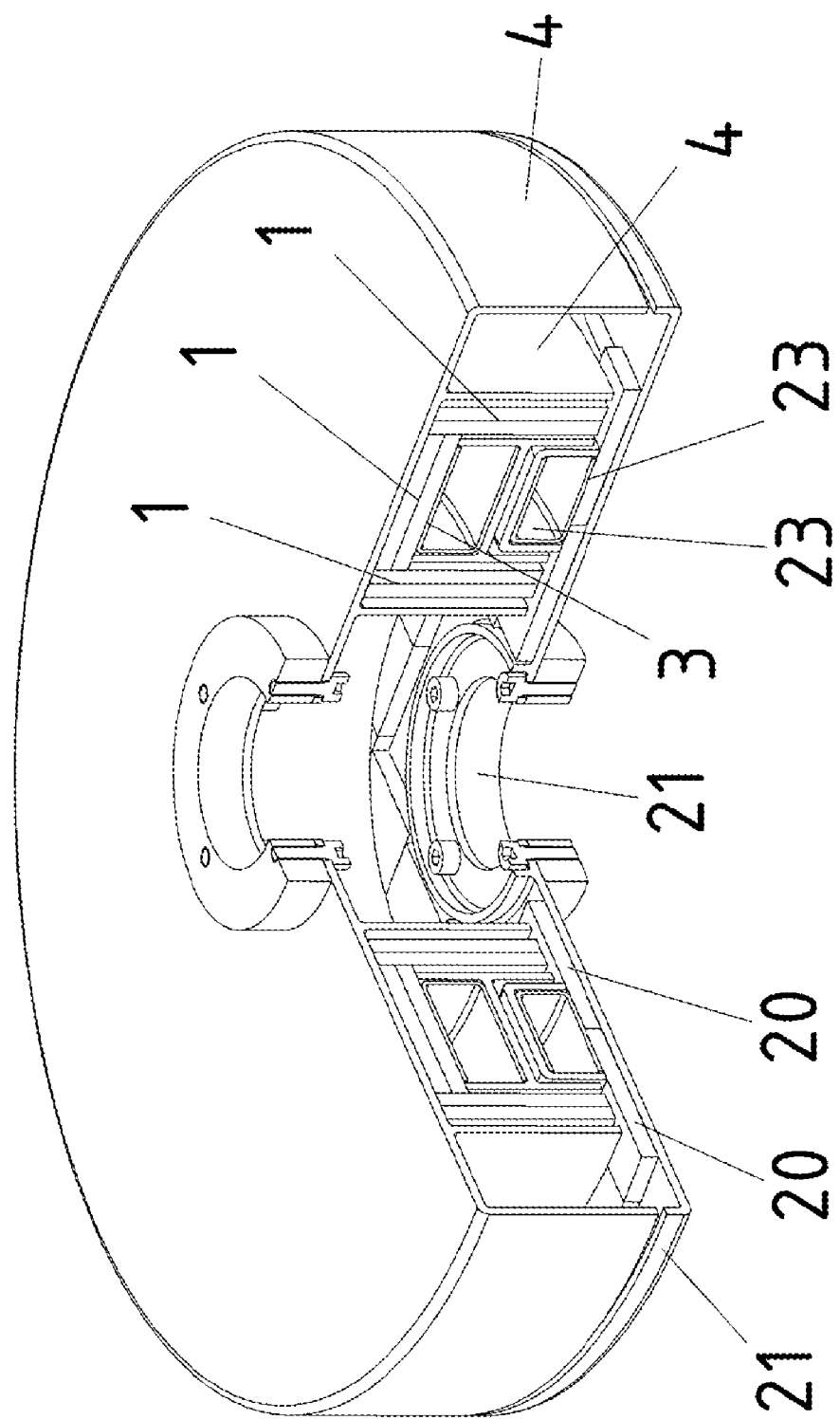

FIG. 3 shows the assembled device. The rotor is provided to the rotatable relative to the stator. During the rotary motion, the inductive coupling is substantially constant.

Ferrite plates 20 of the rotor may be components manufacturable in a simple and cost-effective manner. The U cores situated on the circumference of the stator are manufacturable in each instance from three ferrite plates and are thus simple and cost-effective.

The flux density in the respective U core may be substantially constant. Consequently, not too much material is used, that is, the used material is utilized in an optimal manner and the mass of the device as a whole is reduced. Because the components are all the same, it is possible to achieve a reduction in cost.

Figure 4:
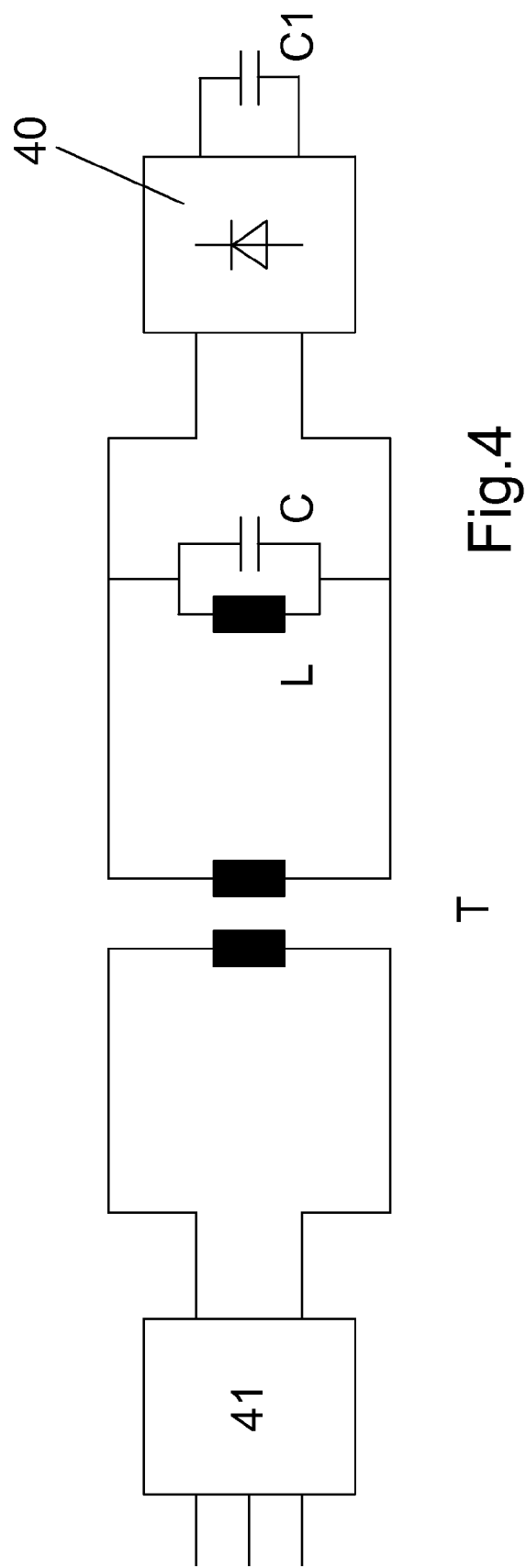

FIG. 4 shows the electrical wiring of rotary transformer T. Power supply 41 provided with alternating current supplies the primary part of rotary transformer T, that is, the stator winding, with a medium frequency voltage of 10-100 kHz, e.g., 20-30 kHz, e.g., 25 kHz. The medium frequency voltage may be implemented as a square wave, which may make it possible to reduce the ohmic losses in the electronic switches of the power stage of the power supply.

As illustrated in FIG. 4, the secondary side winding supplies a rectifier, which has an L-C filter connected in parallel upstream of it. The L-C filter is dimensioned such that a resonant circuit exists having a resonant frequency that corresponds to the medium frequency.

An advantage of the L-C filter is that the voltage supplied by rectifier 40 to the consumer depends as little as possible on the consumer demand. Thus the direct voltage is to the greatest possible extent constant for the consumer. Without L-C filter, this may be distinctly worse.

The rotary transformer has a coupling, which is comparable to those customary in transformers. It is somewhat weaker, however, because an air gap must be bridged.

The inductor L of the L-C filter may be omitted, which produces a slight deterioration, but which makes it still possible to implement the foregoing, e.g., at lower costs.

As in FIG. 4, an exemplary intermediate circuit capacitor C1 of a frequency converter is situated downstream from rectifier 40, from which the power output stage of the frequency converter and thus also a connected electric motor may be supplied.

Instead of drives, including frequency converters and electric motors, other consumers may be supplied as well.

An aspect hereof is also that energy is transmitted, that is, that power of more than 1 kW may be transmitted. This is significant for industrial applications. This is made possible by the L-C filter. The latter also makes possible the contactless energy transmission across a relatively large air gap, which even fluctuates in its value during rotation.

The required transmission of information between the rotating part and the stationary part is transmittable either by higher frequency modulation across the rotary transformer or by other methods such as electromagnetic waves, e.g., radio waves, infrared or other types of waves.

What is claimed is:

1. A system for contactless energy transmission, comprising:
a primary side winding suppliable with a voltage of medium frequency, a coil core provided on the primary side winding, the coil core, in a sectional view in at least one sectional plane, includes an axis of rotation and is formed by a plurality of at least one of (a) U-shaped and (b) C shaped parts around the winding region of the primary side winding, wherein each part is separated by an air gap, wherein the plurality of at least one of (a) U-shaped and (b) C-shaped parts are situated on a circumference of the winding and having shanks oriented in a direction that is oriented parallel to the axis of rotation;
a secondary side winding that is rotatable relative to the primary side winding; and
a parallel-resonant circuit provided on the secondary side winding.

2. The system according to claim 1, wherein a resonant frequency of the parallel-resonant circuit is adjusted to the medium frequency.

3. The system according to claim 1, wherein the parallel-resonant circuit is connected in parallel to the secondary winding to reduce a sensitivity against fluctuations of a value of an air gap between the primary side winding and the secondary side winding.

4. The system according to claim 1, wherein the parallel-resonant circuit includes a filter for a secondary voltage generated on the secondary side winding.

5. The system according to claim 1, further comprising a rectifier connected downstream from the parallel-resonant circuit to generate an intermediate circuit voltage for a frequency converter.

6. The system according to claim 1, wherein the medium frequency voltage is a medium frequency square-wave voltage.

7. The system according to claim 1, wherein higher frequency signals are modulated for data transmission between the primary and the secondary part.

8. The system according to claim 1, wherein further comprising at least one of (a) a leaky waveguide and (b) a slit coaxial cable for data transmission between the primary side winding and the secondary side winding.

9. The system according to claim 1, wherein an inductive coupling between the primary side winding and the secondary side winding is at least one of (a) strong and (b) comparable to a transformer.

10. The system according to claim 1, wherein the air gap is a complete air gap interposed between each part.

11. A system for contactless energy transmission, comprising:
- a primary side winding;
- a secondary side winding rotatable relative to the primary side winding; and
- a coil core provided on the primary side winding, the coil core, in a sectional view in at least one sectional plane, includes an axis of rotation and is formed by a plurality of at least one of (a) U-shaped and (b) C shaped parts around the winding region of the primary side winding, wherein each part is separated by an air gap, wherein the plurality of at least one of (a) U-shaped and (b) C-shaped parts are situated on a circumference of the winding and having shanks oriented in a direction that is oriented parallel to the axis of rotation.

12. The system according to claim 11, wherein a plurality of sectional planes are provided and which are situated with respect to each other such that the sectional planes are rotated about the axis of rotation by at least one of (a) a magnitude of an angle of rotation and (b) a magnitude that is respectively equal to a closest adjacent sectional plane.

13. The system according to claim 11, wherein, on the secondary side, one plane is configured to close a magnetic circuit.

14. The system according to claim 11, wherein the coil core is provided on the primary side winding substantially cup-shaped, an opening of the cup being provided toward the secondary side winding.

15. The system according to claim 11, wherein the coil core is provided on the primary side winding substantially cup-shaped, toward the secondary side winding an opening of the cup being provided.

16. The system according to claim 11, wherein the coil core includes on at least one of (a) the secondary side winding and (b) the primary side winding of at least one of (a) homogeneous formed parts and (b) a plurality of homogeneously formed parts.

17. The system according to claim 11, further comprising a coil core provided on the secondary side winding arranged to be planar.

18. The system according to claim 11, further comprising a coil core provided on the secondary side winding, which includes parallelepiped blocks that are situated in a plane having a direction of surface normal extends parallel to the direction of the axis of rotation.

19. The system according to claim 11, further comprising a coil core provided on the secondary side winding.

* * * * *